United States Patent
Reding et al.

(10) Patent No.: US 7,917,594 B2
(45) Date of Patent: Mar. 29, 2011

(54) METHOD AND SYSTEM FOR NOTIFYING AN INVITEE USER WHEN AN INVITING USER ACCESSES A SOCIAL NETWORKING APPLICATION

(75) Inventors: Craig L. Reding, Midland Park, NJ (US); Paula Dromlewicz, Holden, MA (US); John R. Reformato, Tarrytown, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 354 days.

(21) Appl. No.: 11/694,879

(22) Filed: Mar. 30, 2007

(65) Prior Publication Data

US 2008/0243853 A1 Oct. 2, 2008

(51) Int. Cl.
*G06F 15/16* (2006.01)
*G06F 15/173* (2006.01)
(52) U.S. Cl. ........................ 709/207; 709/224
(58) Field of Classification Search .......... 709/203–204, 709/206–207, 223, 224
See application file for complete search history.

(56) References Cited

U.S. PATENT DOCUMENTS

| | | | |
|---|---|---|---|
| 5,818,616 A * | 10/1998 | Kawai | 398/72 |
| 5,848,415 A * | 12/1998 | Guck | 707/10 |
| 6,016,478 A * | 1/2000 | Zhang et al. | 705/9 |
| 6,343,313 B1 * | 1/2002 | Salesky et al. | 709/204 |
| 6,363,352 B1 * | 3/2002 | Dailey et al. | 705/9 |
| 6,434,599 B1 * | 8/2002 | Porter | 709/204 |
| 6,636,888 B1 * | 10/2003 | Bookspan et al. | 709/203 |
| 6,732,103 B1 * | 5/2004 | Strick et al. | 707/10 |
| 2002/0073169 A1 * | 6/2002 | Takaku et al. | 709/217 |
| 2004/0107249 A1 * | 6/2004 | Moser et al. | 709/204 |

* cited by examiner

*Primary Examiner* — Hussein A Elchanti

(57) ABSTRACT

A system and method may include receiving an access from an inviting terminal requesting access to a social networking application, the access request may be associated with a user identifier, searching a contact database, based on the user identifier and on an application identifier of the social networking application, to identify contact information associated with an invitee terminal, and generating a notification message based on the contact information, the notification message may be useable to indicate to the invitee terminal that the inviting terminal has accessed the social networking application.

20 Claims, 6 Drawing Sheets

Contact Table

| | Invitee Identifier column 402 | Application Identifier column 404 | Terminal Contact Information column 406 | Availability Status column 408 | Terminal Contact Order column 410 | Opted In/Out Status column 412 | Recorded Message column 414 |
|---|---|---|---|---|---|---|---|
| 1 | Bob | Game 1 | Instant Message Identifier | All Day Monday-Friday | None | Opted In | No |
| 2 | Sara | Game 1 | Instant Message Identifier; Telephone Number | All Day Tuesday-Saturday | 1) Laptop 2) Mobile Phone | Opted In | Yes |
| 3 | Frank | Work Teleconference | Telephone Number; email address | 8:00 AM – 5:00 PM Monday-Friday | 1) Mobile Phone, 2) PDA | Opted In | Yes |

METHOD AND SYSTEM FOR NOTIFYING AN INVITEE USER WHEN AN INVITING USER ACCESSES A SOCIAL NETWORKING APPLICATION

BACKGROUND INFORMATION

The Internet is increasingly becoming a tool that permits users to interact socially with one another. Chat sessions, instant messaging, multi-player online video games, and other networked computer programs can create a virtual environment permitting users to communicate with one another via a network. Generally, in such systems, a user can create a username and a password that allows the user to log on and off of a server hosting the networked computer program. The username permits the user to be identified by other users participating in the virtual environment, thereby allowing the user to get to know other users that use the same networked computer program.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 4 illustrates a contact table of a contact server in accordance with exemplary embodiments of the present disclosure.

Figure 1:
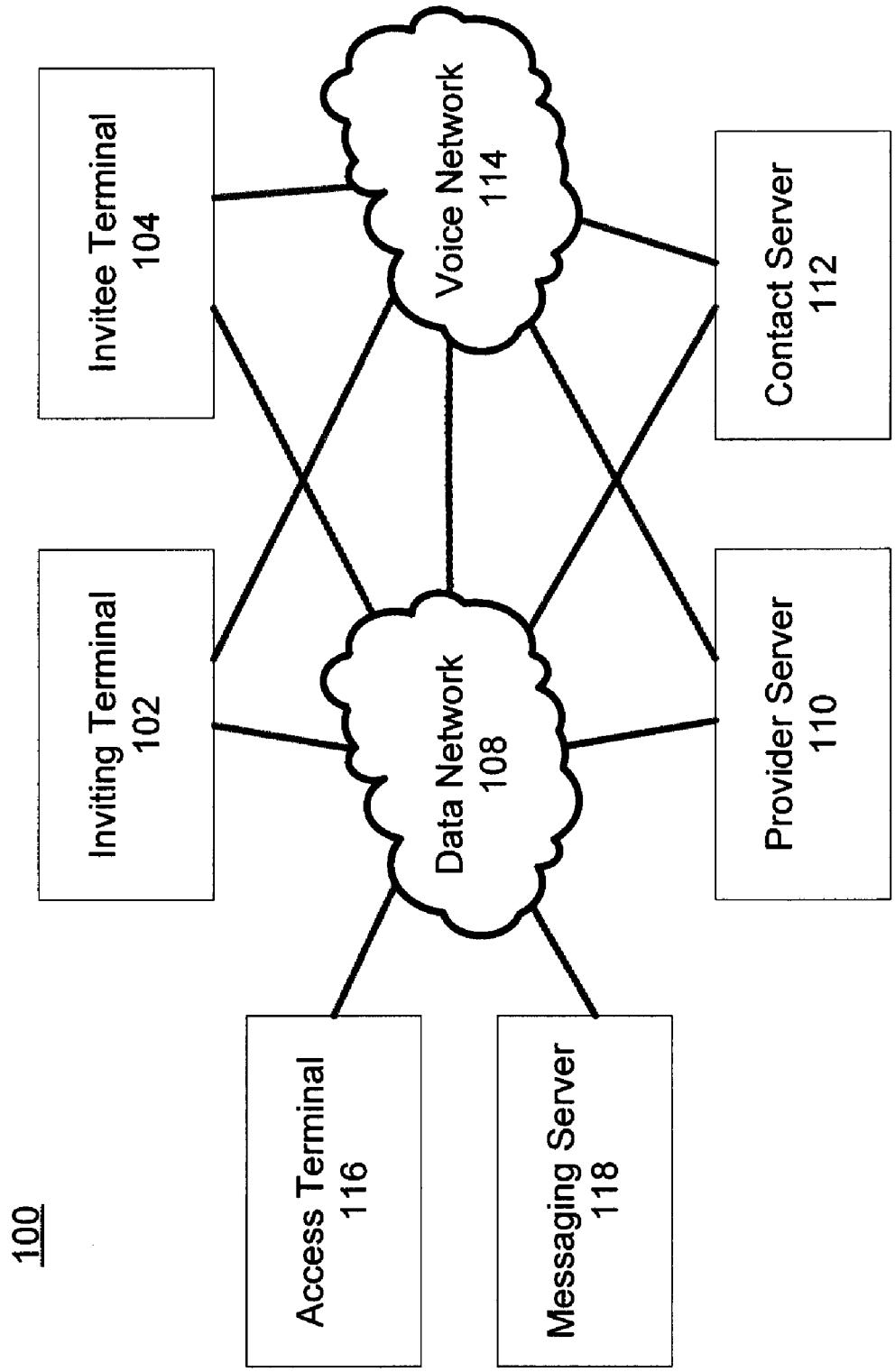
FIG. 1 illustrates a system that may notify invitee users when an inviting user has logged on to access a social networking application in accordance with exemplary embodiments of the present disclosure.

These and other embodiments and advantages can become apparent from the following detailed description, taken in conjunction with the accompanying drawings, illustrating by way of example the principles of the various exemplary embodiments.

DETAILED DESCRIPTION OF EXEMPLARY EMBODIMENTS

A method and system in accordance with exemplary embodiments may include receiving an access request from an inviting terminal requesting access to a social networking application, the access request being associated with a user identifier. The method and system in accordance with exemplary embodiments also may include searching a contact database based on the user identifier to identify contact information associated with an invitee terminal. The method and system in accordance with exemplary embodiments may further include generating a notification message, based on the contact information, for communication to the invitee terminal outside of the social networking application to indicate that the inviting terminal has accessed the social networking application.

The description below describes servers, computers, terminals, and other computing devices that may include one or more modules. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

Conventional social networking applications are limited by their inability to notify users who are not logged into the social network that a particular user has logged on to access the social networking application. Communication is limited to exchanges between participants who are logged on to a particular social networking application at the same time. Conventional social networking applications do not provide a notification feature where a user who has logged on to access a social networking application can notify and/or invite users who are not logged on to the social networking application to log on and interact with the logged on user. For example, online gaming communities support in-game messaging with text and voice, but there is no convenient way for a player to notify fellow gamers who are not in-game that the player has logged on to the game.

According to exemplary embodiments, an inviting user may identify in a display which invitee user, or group of invitee users, the inviting user regularly interacts with via a particular social networking application. The identified invitee users may be stored in a contact database. Generally, the social networking application may be any networked application that a computing device may use to create an interface and/or virtual environment permitting multiple users to interact with one another via multiple terminals communicating with one another via a network. The social networking application may be, for example, an instant messaging service, a multi-player online video game, a bridge for a teleconference, and any other application permitting multiple users to interact with one another via multiple terminals communicating via a network.

Upon logging on to a particular social networking application, the system in accordance with exemplary embodiments may search a contact database based on a user identifier associated with the inviting user and may send a notification message to an invitee user, or group of invitee users, identified in the contact database to inform the invitee users that the inviting user has logged on to access the social networking application. The notification message may be sent within or outside of the social networking application via one or more networks (e.g., voice and/or data networks, etc.). For example, the notification message may be a short message service (SMS) message, an instant messaging (IM) message, pre-recorded video and/or audio, a text message, or other communications (including in-game, if one or more invitee users are already there), and/or combinations thereof. The notification message may include, for example, an invitation to join a particular server (e.g., game, chat room, etc.) or area within the social networking application (e.g., area within a game, particular server, clan, guild, etc.), may simply notify the invitee user that the inviting user has logged on to access the social networking application, or may perform other functions, as will be described below in further detail.

FIG. 1 illustrates a system 100 that may notify invitee users when an inviting user has logged on to access a social networking application in accordance with exemplary embodiments of the present disclosure. The system 100 may include an inviting terminal 102, an invitee terminal 104, a data network 108, a provider server 110, a contact server 112, a voice network 114, an access terminal 116, and a messaging server 118. It is noted that system 100 is a simplified view of a network, and may include additional network elements that are not depicted. Moreover, the system 100 may include multiple instances of all of the components illustrated in FIG. 1. It is noted that the provider server 110 and the contact server 112 may be implemented on a single server, instead of on two separate servers, as shown. The servers depicted also each may represent multiple servers in a server farm, some or all of which may be local and/or remote to one another.

The inviting terminal 102 and the invitee terminal 104 may be communication devices capable of exchanging digital data signals and/or analog signals over a network. The digital data signals may be, for example, packets (e.g., IP packets), cells (e.g., ATM cells), and/or other digital data types. The analog signals may be, for example, telephony signals. The inviting terminal 102 may be used by the inviting user. One or more inviting terminals 102 may be associated with each inviting user. The invitee terminal 104 may be used by an invitee user. One or more invitee terminals 104 may be associated with each invitee user. Only a single inviting terminal 102 and a single invitee terminal 104 are depicted for clarity; however, multiple instances of these devices may be used in the system 100. The inviting terminal 102 and the invitee terminal 104 may be communication devices, such as, but not limited to, computers (e.g., desktop computers, laptop computers, etc.), personal digital assistants (PDAs), phones (e.g., landline, mobile phone, cellular phone, etc.), as well as other devices capable of communicating digital data signals and/or analog signals via a network, and/or combinations thereof.

The inviting terminal 102 and the invitee terminal 104 may be communicatively coupled to data network 108 and/or to voice network 114. The data network 108 may be a wired network, a wireless network, or both, and the voice network 114 may be a wired network, a wireless network, or both. The data network 108 may support various protocols for use in exchanging digital data signals with the inviting terminal 102 and/or the invitee terminal 104. For example, the data network 108 may support circuit switched protocols, such as, but not limited to, Asynchronous Transfer Mode (ATM), and also may support packet switched protocols, such as, but not limited to, Transmission Control Protocol/Internet Protocol (TCP/IP). Other data protocols also may be used, and conversions between one or more protocols also may occur. The voice network 114 may be, for example, a public switched telephone network (PSTN), which may support the telephony signaling protocol Signaling System 7 (SS7). Other telephony protocols also may be used, and conversions between one or more protocols also may occur.

The provider server 110 may be a communication device that hosts the social networking application. The provider server 110 may exchange digital data signals and/or analog signals over a network to permit users of the social networking application at their respective terminals to interact with one another via the network. For example, the provider server 110 may host a multi-player online video game where users remote to one another play the game with one another via data network 108. In another example, the provider server 110 may host a telephone bridge useable for a teleconference. The provider server 110 may store a contact list set up by the inviting user for use in contacting other users that may access the social networking application. The provider server 110 may use the contact list to inform the inviting users at the inviting terminal 102 other users from the contact list who have logged on to the social networking application and those who have not.

Once the inviting user logs on, the provider server 110 may use the contact list to notify the other users identified in the contact list that the inviting user has logged on to the social networking application. For example, once the inviting users logs on to a video game, the provider server 110 may communicate a logged on message to the other gamers on the contact list who are also logged on. In another example, the contact list may be a buddies list of users that the inviting user regularly plays against in a multi-player online video game. In a further example, the provider server 110 can provide a pop-up message, a video display, an audio display, etc., and/or combinations thereof to inform the inviting user which invitee users from the contact list have logged on to the social networking application.

The contact server 112 may communicate digital data signals and/or analog signals over a network. The contact server 112 may store a contact database where an inviting user may identify and associate one or more invitee users with one or more social networking applications. The contact server 112 may use the contact database to communicate notification messages to invitee users who are not logged on to the social networking application when the inviting user logs on to access the social networking application.

When the inviting user, via the inviting terminal 102, logs on to access the particular social networking application on the provider server 110, the provider server 110 may identify any users from the inviting user's contact list who have not logged on to access the social networking application. The provider server 110 may communicate an access event, which may be associated with or may include a user identifier of the inviting user and optionally may include an application identifier associated with the social networking application, to notify the contact server 112 that the inviting user has logged on to access the social networking application. The application identifier may be a number, symbol, and/or letter sequence, an Internet Protocol address, or other identifying information that may uniquely identify the social networking application. The application identifier may be used to distinguish between various social networking applications. For example, a first social networking application may include a unique application identifier of "Game1," and a second social networking application may include a unique application identifier of "Game2." Thus, the contact server 112 may determine which social networking application the access event has been received from based on receiving the application identifier of "Game1" or "Game2." Other application identifiers also may be used. The application identifier also may include a subapplication identifier. Accessing the subapplication may occur at the same or different time the social networking application is accessed. Receipt of the subapplication identifier by the contact server 112 may be used to send a subsequent notification message when the inviting user accesses the subapplication after accessing the social networking application. The subapplication identifier may be a number, symbol, and/or letter sequence or other identifying information that may uniquely distinguish one subapplication within the social networking application from another subapplication. For example, the social networking application may provide a card game website, with a poker subapplication and a blackjack subapplication. When the inviting user logs on to access the poker subapplication, the subapplication identifier may indicate to the contact server 112 to notify invitee users with which the inviting user plays poker, instead of the invitee users with which the inviting users plays blackjack. Also, the subapplication identifier may be omitted and both the poker invitee users and the blackjack invitee users may be notified.

The contact server 112 may receive and process the access event to determine whether to create a notification message to notify and/or invite the invitee users who are not logged on to access the social networking application. The contact server 112 may search the contact database to identify contact information associated with the invitee terminals 104 of the invitee users who have not logged on. The contact information may be information useable to route or to obtain information for routing a notification message to the invitee terminal 104. For example, the contact information may be a voice network number (e.g., telephone number, pager number, etc.), a data network address (e.g., Internet Protocol address, etc.), information useable to query a computing device (e.g., server, etc.) to obtain from the computing device a data network address of the inviting terminal 104, etc. If any invitees exist who have not logged on, the contact server 112 may send the notification message to the invitee terminals 104 to notify and/or invite the invitee users to join the inviting user at the particular social networking application, as will be described in further detail below.

The access terminal 116 may exchange digital data signals via the data network 108. The access terminal 116 also may indirectly or directly exchange analog signals via the voice network 114. The access terminal 116 may receive an access request from an inviting user that may be used to generate a notification message to notify invitee users that the inviting user has accessed the access terminal 116. For example, the access terminal 116 may be a magnetic strip reader, a keyboard, a computing device, a laptop, an RFID tag reader, or other device capable of communicating an access request to the contact server 112 via a network. The access terminal 116 may be installed at a location where the inviting user wants to alert invitee users about the inviting user's location. For example, the inviting user may go to a fitness center and swipe a card having a magnetic strip through a magnetic strip reader at an entrance of the fitness center. The access terminal 116 may send an access request containing the user identifier stored in the magnetic strip to the contact server 112. The contact server 112 may use the user identifier to identify invitee users and, if the invitee users are not at the fitness center, to generate a notification message to notify the invitee users that the inviting user is at the fitness center. For example, the notification message may be communicated to fitness trainer or to a person with which the inviting user typically works out. The access terminal 116 also may be placed at parking garage entrances/exits, building entrances/exits, and/or other locations where an inviting users may wish to notify the inviting users about a location of the inviting user.

The messaging server 118 may exchange digital data signals via the data network 108. The messaging server 118 may host a social networking application different than the social networking application hosted by the provider server 110. The messaging server 118 also may be a web server or other data communicating device that may store or may be able to determine a data network address stored at the inviting terminal 102 and/or invitee terminal 104. A single messaging server 118 is shown in FIG. 1, however, the system 100 may include multiple messaging servers 118 that may host separate social networking applications.

The messaging server 118 may interact with the inviting terminal 102 and/or the invitee terminal 104 and may store a data network address assigned to the inviting terminal 102 and/or the invitee terminal 104. The terminals 102 and 104 may be assigned a data network address by the data network 108 to permit other terminals, servers, etc., to communicate with the terminals 102 and 104. For example, the data network 108 may assign each of the terminals 102 and 104 an Internet Protocol address. The messaging server 118 may store the Internet Protocol address assigned to the terminals 102 and 104 in order to communicate Internet Protocol packets to the terminals 102 and 104. The messaging server 118 may receive queries about the data network addresses of the terminals 102 and 104 from the contact server 112 and may respond to the queries with the network addresses assigned to the terminals 102 and 104, if known.

Figure 2:
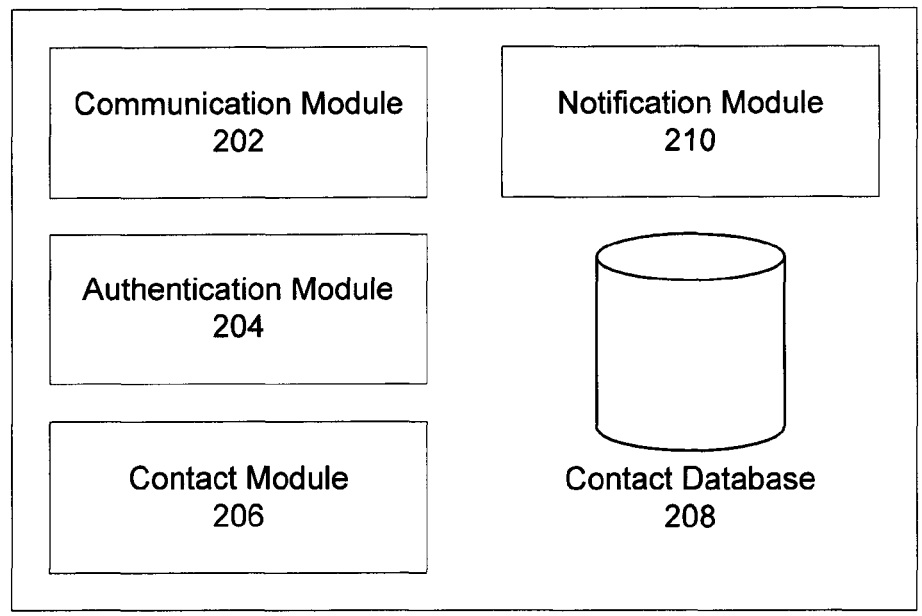
FIG. 2 illustrates various modules that may be included in a contact server of a system in accordance with exemplary embodiments of the present disclosure.

FIG. 2 illustrates various modules that may be included in the contact server 112 in accordance with exemplary embodiments of the present disclosure. The contact server 112 may include a communication module 202, an authentication module 204, a contact module 206, a contact database 208, and a notification module 210. The communication module 202 may communicate analog signals and/or digital data signals via the data network 108 and/or the voice network 114. The communication module 202 may forward analog signals and/or digital data signals received via the data network 108 and/or the voice network 114 to the appropriate module 204, 206, and/or 210 of the contact server 112.

The authentication module 204 may perform authentication of users before allowing the users to access and/or update the contact database 208. The inviting user, via the inviting terminal 102, may forward a contact database request that requests to create, modify, delete, etc., invitee information stored in the contact database 208 useable to send notification messages to the invitee terminals 104. For example, the contact database request may include an invitee identifier and contact information associated with the invitee terminal 104 to update the contact information of the invitee user. An inviting user at the inviting terminal 102 attempting to create or update a contact table or other data structure in the contact database 208 may access a website or other communication interface of the contact server 112 via the data network 108 and/or voice network 114. The inviting user may enter information via the communication interface useable to uniquely identify the inviting user, such as, but not limited to, a name, a first name, a surname, an online name, a home address, a social security number, a credit card number, other identifying information unique to the inviting user, and/or combinations thereof. Once identified, the authentication module 204 may create and forward a user identifier to the inviting user to permit the inviting user to be authenticated using the user identifier. The user identifier may be, for example, a username in combination with a password, a number sequence, a letter sequence, a symbol sequence, etc., and/or combinations thereof. The authentication module 204 also may permit the user to select the user identifier, such as, but not limited to, a username in combination with a password. The user identifier also may be embedded in a Radio Frequency Identification (RFID) tag or in a magnetic strip of a card that is provided to the inviting user, which the access terminal 116 may read to determine whether to grant access to a particular area, device, etc.

The notification module 210 may interact with the contact module 206 and the contact database 208 to identify invitee users that the inviting user desires to notify and/or invite to join the social networking application in which the inviting user is participating. When the inviting user logs on to access the social networking application at the provider server 110, the provider server 110 may authenticate the inviting user and may forward to the contact server 112 an access event associated with the user identifier and optionally may include an application identifier associated with the social networking application. The contact server 112 also may identify the social networking application based on the provider server 110 from which the access event is received. If the user identifier is not included, the contact server 112 may identify the user identifier based on the access request. For example, the provider server 110 may have login data useable to identify the inviting user, which may be included in the access event and the contact server 112 may identify the user identifier based on the login data. The contact server 110 may search the contact database 208 to identify an invitee user or a group of invitees based on the user identifier and optionally based on the application identifier. The contact server 112 may then create and transmit notification messages to invitee terminals 104 based on the identified invitee users, as will be described in further detail below.

The contact module 206 may prompt the inviting user in an invitee information input prompt message to create, modify, add, delete, etc., entries in a contact table of the contact database 208 to identify invitee users the inviting user desires to notify when the inviting user accesses a particular social networking application.

Figure 3:
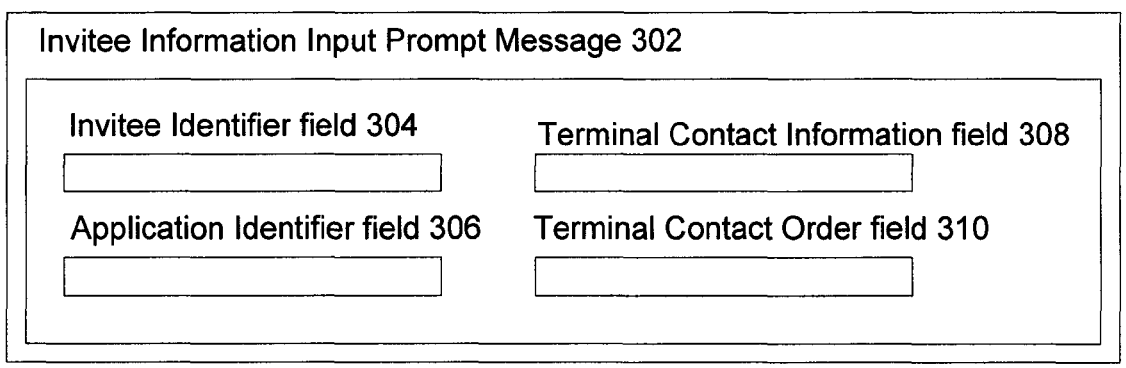
FIG. 3 illustrates an invitee information input prompt message that may be presented to the inviting user at an inviting terminal of a system in accordance with exemplary embodiments of the present disclosure.

FIG. 3 illustrates an invitee information input prompt message 302 that may be presented to the inviting user at the inviting terminal 102 in accordance with exemplary embodiments of the present disclosure. To prompt the inviting user to identify various invitee information associated with one or more invitee users, the invitee information input prompt message 302 may include an invitee identifier field 304, an application identifier field 306, a terminal contact information field 308, and a terminal contact order field 310.

In the invitee identifier field 304, the inviting user may specify information useable to identify an invitee user. For example, the inviting user may specify a name, a first name, a surname, a screen name, an instant message name, a codename, a nickname, a sequence of digits, a symbol sequence, a letter sequence, an email address, other information that the inviting user may use to identify the invitee user, other information the invitee user uses for identification, and/or combinations thereof.

In the application identifier field 306, the inviting user may specify one or more social networking applications to which the inviting user desires to associate with the invitee user. For example, the inviting user may identify a particular multi-player online video game that he plays with an invitee user. The inviting users also may identify one or more subapplications within the social networking application to which the inviting user desires to associate with the invitee user In the terminal contact information field 308, the inviting user may specify terminal contact information (e.g., one or more data network addresses, telephone numbers, etc.) associated with one or more invitee terminals 104 of the invitee user. The contact server 112 may use the terminal contact information to send a notification message to the one or more invitee terminals 104 associated with the invitee user. For example, the inviting user may know that the invitee user has a mobile phone, a pager, and a laptop computer. Because the mobile phone and the pager are assigned a permanent number that may be used to call these devices, the inviting user may input a phone number for the mobile phone as a first voice network number and a pager number of the pager as a second voice network number in the terminal contact information field 308. For devices communicating via the data network 108 that are assigned data network addresses (e.g., Internet protocol address, etc.) by the data network 108, the inviting user may identify in the terminal contact information field 308 a messaging service used by the invitee user, along with a messaging service username, to query the messaging server 118 to identify a data network address associated with the invitee terminal 104 of the invitee user. For example, the messaging service may be an instant messaging service, which may be hosted by the messaging server 118.

Upon receiving the access event, the contact server 112 may query the messaging server 118 to determine if the invitee terminal 104 associated with the invitee user is communicating via the messaging service, and to query the messaging server 118 to identify a data network address (e.g. Internet protocol address, etc.) assigned to the invitee terminal 104. The messaging server 118 may determine if the invitee user associated with the invitee terminal 104 has granted permission in a user profile to having the data network address associated with the invitee terminal 104 to be given out to other devices or if the messaging server 118 or applicable law permits such queries.

If permitted, the messaging server 118 may return a data network address of the invitee terminal 104 associated with the invitee user is communicating via the messaging service and may return a data network address unknown message if the invitee terminal 104 is not communicating via the messaging service or if the invitee user, the messaging server 118, or applicable law does permit giving out the data network address associated with the invitee terminal 104 to other devices. The data network address may be used by the contact server 112 to route a notification message to the invitee terminal 104 via the data network 108.

In the terminal contact order field 310, the inviting user may specify an order in which the invitee terminals 104 associated with a particular invitee user are sent notification messages. The inviting user also may specify an order in which the invitee users are invited. For example, the inviting user may specify that first an instant message is to be sent to a computer of the invitee user, and if no response is received, then to call a mobile phone of the invitee user, and if no response is received, then to page a pager of the invitee user, and if no response is received, then to forward an email to the invitee user. Other contact orders and other invitee terminals also may be specified. The inviting user also may specify that a notification message is sequentially and/or simultaneously communicated to multiple or all invitee terminals 104 associated with a particular invitee user. Additionally, the inviting user may specify whether a voice, text, and/or video message is to be left at each of these invitee terminals 104 if no response is received within a certain time period. After receipt of the notification message at one or more of the invitee terminals 104, in response, the invitee user may select a preferences option to modify the terminal contact order, as will be discussed in further detail below.

The invitee information input prompt message 302 also may permit the inviting user to identify certain times of the day to send a notification message (e.g., 8:00 pm-11:00 pm Monday-Friday, etc.) when the inviting users may believe that the invitee user is likely to respond. Once the inviting users submits some or all of the invitee information requested in the invitee information input prompt message 302, the contact module 206 may store the received information in the contact database 208 as a contact table (or other data structure), or may update the contact table based on the received invitee information.

FIG. 4 illustrates a contact table 400 in accordance with exemplary embodiments of the present disclosure. Data structures for structuring of the invitee information other than a contact table also may be used. The contact table 400 may be associated with the user identifier of the inviting user, and may store entries to determine whether a notification message may be forwarded to an invitee terminal 104 associated with each invitee user. The contact table 400 may include an invitee identifier column 402, an application identifier column 404, a terminal contact information column 406, an availability status column 408, a terminal contact order column 410, and an opted in/out status column 412. Columns 402-410 correspond to the information entered in the invitee information input prompt message 302 by the inviting user at the inviting terminal 102, as discussed above. The opted in/out status column 412 may permit an invitee user to respond to the notification message by opting in/out of receiving further notification messages, as will be discussed in further detail below. The contact table 400 may optionally include a logged on/off column (not shown) that indicates whether each invitee user has logged on to a particular social networking application. The contact table 400 also may include a subapplication identifier column (not shown) to further to indicate the inviting user desires that some, but not all, of the invitee users associated with the social networking application be notified when the inviting user logs on to access the social networking application.

The exemplary contact table 400 includes rows 1-3, with each row corresponding to an invitee user. In row 1, the name "Bob" is specified in the invitee identifier column 402, "Game 1" is specified in the application identifier column 404, "Instant Message Identifier" provided by company X is specified in the terminal contact information column 406, "All day Monday-Friday" is specified in the availability status column 408, "none" is specified in the terminal contact order column 410, and "opted-in" is specified in the opted in/out status column 412. In row 2, the name "Sara" is specified in the invitee identifier column 402, "Game 1" is specified in the application identifier column 404, "Instant Message Identifier" provided by company X and "Telephone Number" are specified in the terminal contact information column 406, "All day Tuesday-Saturday" is specified in the availability status column 408, "Laptop" is first specified, followed by "Mobile Phone" in the terminal contact order column 410, and "opted-in" is specified in the opted in/out status column 412. In row 3, the name "Frank" is specified in the invitee identifier column 402, "Work Teleconference" is specified in the application identifier column 404, "Telephone Number" and "Email Address" are specified in the terminal contact information column 406, "8:00 AM-5:00 PM Monday-Friday" is specified in the availability status column 408, "mobile phone" is first specified, followed by "PDA" in the terminal contact order column 410, and "opted-in" is specified in the opted in/out status column 412. It is noted that the entries in the Contact table 400 are exemplary; other information may be specified therein and more or fewer entries may be used.

After the contact server 112 has created the contact table 400 for the inviting user, when the inviting user subsequently logs on to access the social networking application of the provider server 110, the provider server 110 may interact with the contact server 112 to notify and/or invite the invitee users identified in the contact table 400 who have not already logged on to access the social networking application.

Figure 5:
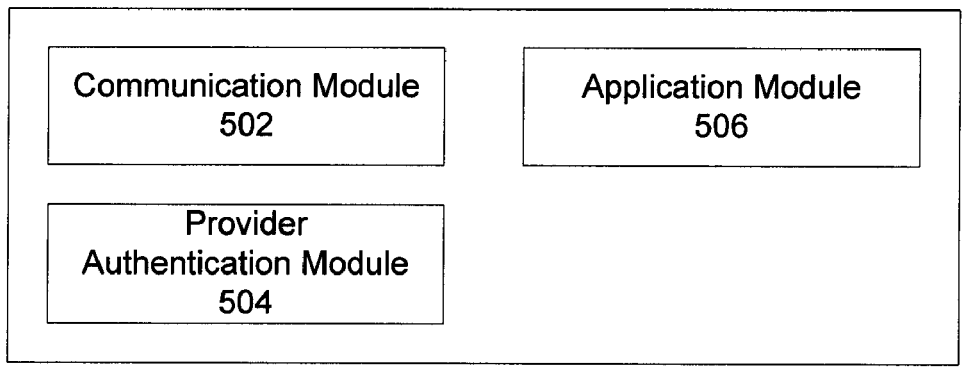
FIG. 5 illustrates a provider server of a system in accordance with exemplary embodiments of the present disclosure.

FIG. 5 further depicts the provider server 110 in accordance with exemplary embodiments of the present disclosure. The provider server 110 may include a communication module 502, a provider authentication module 504, and an application module 506. The communication module 502 may permit the provider server 110 to communicate digital data and/or analog signals via the data network 108 and/or the voice network 114.

The provider authentication module 504 may perform authentication of inviting users before allowing the inviting users to access the social networking application. An inviting user at the inviting terminal 102 attempting to access the social networking application may access a website or other communication interface (not shown) of the provider server 110 via the data network 108 and/or the voice network 114. The inviting user may use the communication interface to enter information useable to uniquely identify the inviting user, such as, but not limited to, a name, a home address, a social security number, a credit card number, other identifying information, and/or combinations thereof. Once identified, the provider authentication module 504 may create and forward provider login data to the user to permit the user to be authenticated using the provider login data. The provider login data may be, for example, a username in combination with a password, a number and/or letter sequence, etc. The login data may be the same or different than the user identifier. The login data also may be associated with the user identifier, where the user identifier may be looked up in a table when the login data is received. The provider authentication module 504 also may permit the user to select the login data, such as, but not limited to, a username in combination with a password.

The inviting user may indicate via the communication interface of the provider server 110 that a contact table has been created with the contact server 112. The provider authentication module 504 of the provider server 110 and the authentication module 204 of the contact server 112 may exchange information permitting the inviting user to login to both the provider server 110 and the contact server 112 using the login data, the user identifier, or both, or may specify that the inviting user may separately login to each of the provider server 110 and the contact server 112. The provider server 110 and the contact server 112 also may permit the inviting user to modify the login data to be the same as the user identifier, or to modify the user identifier to be the same as the login data. Thereafter, the provider server 110 and the contact server 112 may have a single login to authenticate the inviting user or may have separate logins to authenticate the inviting user.

To log on to the provider server 110, the inviting user may instruct the inviting terminal 102 to communicate an access request, which may be associated with or include the user identifier and optionally the login data, to the provider server 110. After the inviting user is authenticated by the provider authentication module 504, the inviting terminal 102 may establish a communication session for exchanging digital data signals and/or analog signals with the application module 506. The application module 506 may provide the functionality of the social networking application. For example, the application module 506 may be the software that generates a multi-player gaming environment that permit multiple users to play one another via the data network 108, may create a bridge that sets up a teleconference/videoconference via the data network 108 and/or the voice network 114, etc. The communication session may permit the inviting terminal 102 to exchange real-time data, non-real-time data, digital data signals, audio, video, analog signals, telephony signals, other signals, and/or combinations thereof with the provider server 110 via the data network 108 and/or the voice network 114.

After the inviting user logs on to the provider server 110, the application module 506 may retrieve a contact list associated with the inviting user. The contact list may include an invitee identifier associated with each invitee user in the contact list. The invitee identifiers of the contact list may match the invitee identifiers stored in the contact table, or the contact server 112 may translate the invitee identifiers of the contact list to the invitee identifiers stored in the contact table. The application module 506 may inform the invitee users who previously have logged on that the inviting user has logged on to access the social networking application based on the contact list. For example, the application module 506 may communicate an in-game message to the other users on the contact list who have logged on. The application module 506 also may identify the invitee users from the contact list who have not logged on to access the social networking application and cannot be accessed by sending a communication via the social networking application.

If one or more invitee users are not logged on, the provider server 110 may communicate an access event to the contact server 112 indicating that the inviting user has logged on to access the social networking application and that one or more invitee users associated with the invitee user are not logged on to access the social networking application. The inviting user also may specify that the provider server 110 send the access event at the request of the inviting user instead of automatically upon authentication. The access event may be associated with the user identifier of the inviting user. For example, the access event may include the user identifier, or may include the login data of the provider server 110 which may be used by the contact server 112 to retrieve the user identifier. The access event optionally may include one or more invitee identifiers of invitee users who have or have not logged on to access the social networking application, may optionally include an application identifier to identify which social networking application the inviting user has accessed. The application identifier optionally may include a subapplication identifier of a subapplication accessed by the inviting user within the social networking application.

The inviting users also may communicate override information to the provider server 110 via the inviting terminal 102 for inclusion in the access event. The override information may override the contact information stored in the terminal contact information column 406 and/or may override the information stored in the terminal contact order column 410 of the contact table 400. For example, the override information may list a telephone number of the invitee user not previously included in the contact table 400, or, for terminal contact order information that specifies that an invitee is first forwarded an instant message before being paged, the override information may instruct that the invitee user be paged first before sending the instant message. Other similar changes to the contact table 400 may be included in the override information.

The contact server 112 may receive the access event via the data network 108 and/or voice network 114 at the communication module 202, which may forward the access event to the contact module 206. If override information is included, the contact module 206 may forward the contact information and/or terminal contact order from the access event to the notification module 210 to generate the notification message as specified in the override information. If override information is not included, the contact module 206 may access and search the contact database 208 based on the user identifier and optionally based on the application identifier. For example, the contact database 208 may store the contact table 400 as a searchable tree structure.

Figure 6:
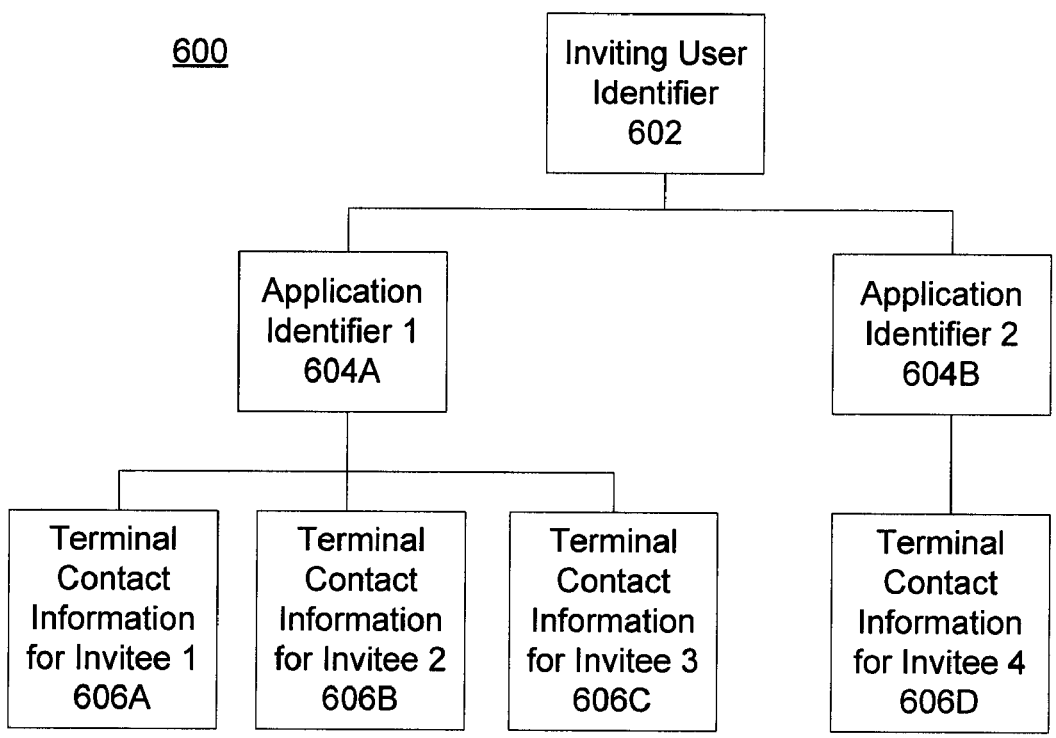
FIG. 6 illustrates a searchable tree structure in accordance with exemplary embodiments of the present disclosure.

FIG. 6 depicts a searchable tree structure 600 in accordance with exemplary embodiments of the present disclosure. The searchable tree structure 600 may include an inviting user identifier 602 at a top level, followed by an application identifier 1 604A and an application identifier 2 604B at a next lower level. Beneath the application identifier 1 604A is terminal contact information for invitee 1 606A, terminal contact information for invitee 2 606B, and terminal contact information for invitee 3 606C. Beneath the application identifier 2 604B is terminal contact information for invitee 4 606D. The contact module 206 may first search the contact table 400 for matches between the inviting user identifier associated with the access event and the contact table 400. Next, the contact module 206 may search the contact table 400 for matches between the application identifier associated with the access event and the contact table 400. Once any invitee users are identified that match both the inviting user identifier and the application identifier, based on the contact table 400, the contact module 206 may determine if the invitee users have opted in and if the availability status of each invitee user indicates they are available at the time when the access event is received (see also FIG. 4, columns 408 and 410). The contact module 206 may eliminate any matches with invitee identifiers included in the access event that have already logged on to the social networking application. If the contact table 400 indicates that the identified invitee users have opted in and are available, then the contact module 206 may retrieve and forward contact information of one or more invitee terminals 104, which may be a voice network number, (see FIG. 4, column 406) and the terminal contact order information (see FIG. 4, column 410) to the notification module 210. For the matching data invitee terminals 104, the contact module 206 may instruct the communication module 202 to query the messaging server 118 via the data network 108 to determine if the invitee user is communicating via the messaging service of the messaging server 118. If communicating, the messaging server 118 may return a data network address (e.g., assigned Internet Protocol address, etc.) of the invitee terminal 104 to the contact server 112.

The notification module 210 may then generate and communicate one or more notification messages to the invitee terminals 104 outside of a communication session established between the invitee terminals 104 and the social networking application. For example, the invitee terminals 104 may not have established a communication session with the social networking application to receive the notification messages. The notification messages may be created using the retrieved contact information (i.e., one or more voice network numbers and/or data network addresses), the order specified in the terminal contact order information, and capabilities information of the invitee terminal 104. The capabilities information may separate invitee terminals into two category types: voice invitee terminals and data invitee terminals. Data invitee terminals may include devices that may communicate both analog signals (e.g., voice, etc.) and digital data signals. The notification module 210 may generate notification messages appropriate for the invitee terminal 104 based on whether the invitee terminal may be a voice or data terminal. Notification messages for voice invitee terminals may include, for example, audio, a page, a short message service (SMS) message, a pre-recorded message, a voice message recorded by the inviting user, other audible messages, etc., and/or combinations thereof. Notification messages for data terminals may include, for example, text messages, instant messages, emails, audio, video, other digitizeable messages, etc., and/or combinations thereof. Hence, the invitee terminals 104 may receive the notification messages without having established a communication session with the social networking application. Thus, invitee users who are not accessing the social networking application may be notified that the inviting user has accessed the social networking application. It is noted that the invitee users need not have previously created an account with the provider server 110 to receive the notification message. The notification message may include an invitation to set up an account with the provider server 110 to access the social networking application. The provider server 110 also may authenticate the invitee user before granting access to the social networking application, in a manner similar to that described for the inviting user.

Figure 7:
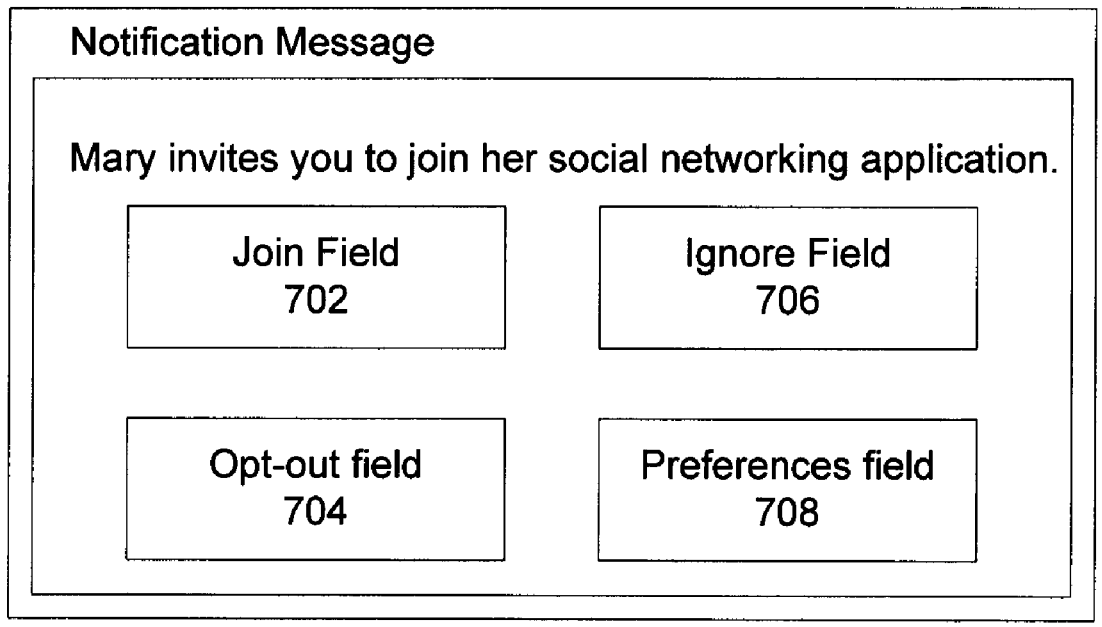
FIG. 7 illustrates a notification message displayable at an invitee terminal in accordance with exemplary embodiments of the present disclosure.

FIG. 7 illustrates a notification message 700 displayable at an invitee terminal 104 in accordance with exemplary embodiments of the present disclosure. The notification message 700 may identify the inviting user and may include a notification indicating which social networking application the invitee is being asked to join. For example, the notification message 700 may state "Mary invites you to join her social networking application." The notification message 700 also may include various fields to permit the invitee user to respond to the notification message. In an exemplary embodiment, the notification message 700 may include a join field 702, an opt-out field 704, an ignore field 706, and a preferences field 708. The notification message 700 also may be presented to the invitee terminal 104 as audio, video, etc.

By selecting the join field 702, if capable, the invitee terminal 104 may communicate a join request to the provider server 110 to establish a communication session between the invitee terminal 104 and the provider server 110 thereby permitting the invitee terminal 104 to request to access the social networking application in which the inviting user is already participating. The invitee terminal 104 may be considered capable to establish a communication session if able to communicate the same signals (e.g., analog and/or digital) that are communicated in the social networking application. The provider server 110 may authenticate the invitee user prior to granting access to the social networking application. If the inviting terminal 104 is not capable of establishing a communication session with the provider server 110, selecting the join field 702 may return a response indicating that the invitee user intends to access another terminal capable of establishing a communication session with the provider server 110 to access the social networking application.

By selecting the opt-out field 704, the invitee terminal 104 may communicate an opt out request to the contact server 112 instructing the contact server 112 to update the contact table 400 to indicate that the invitee user has opted out from receiving any further notification messages from the inviting user. By selecting the ignore field 706, the invitee terminal 104 may ignore the notification message.

By selecting the preferences field 708, the invitee terminal 104 may communicate a preferences request to the contact server 112 to update the contact table 400. For example, the invitee may indicate contact information of other terminals where the invitee user may be contacted, times when the invitee user is available, the order of which terminals the invitee user prefers to be contacted, etc., and/or combinations thereof. If the invitee selects the join field 702 or the ignore field 706, the invitee terminal 104 may forward an invitee response message 800 to the provider server 110, which may be forwarded for display at the inviting terminal 102.

Figure 8:
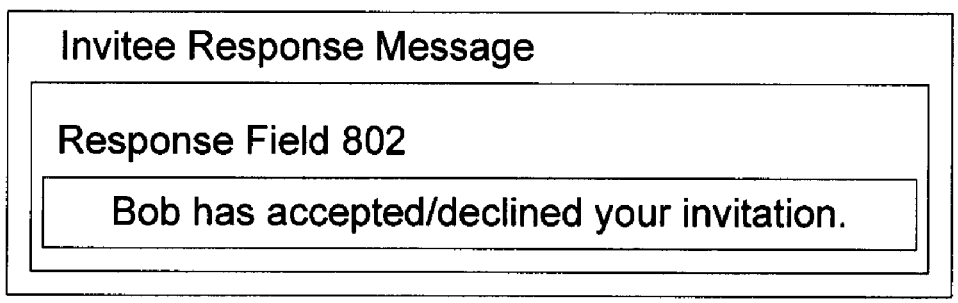
FIG. 8 illustrates an invitee response message in accordance with exemplary embodiments of the present disclosure.

FIG. 8 illustrates an invitee response message 800 in accordance with exemplary embodiments of the present disclosure. The invitee response message 800 may include a response field 802 indicating whether the invitee has accepted or declined the invitation. For example, the invitee response message 800 can appear as a pop-up message in the social networking application to which the inviting user has accessed. The invitee response message 800 also may be a link, a flag, an audible sound or message, a video message, or other indication of whether the invitee has accepted or declined the invitation that appears at the inviting terminal 102.

It is noted that the above description describes the provider server 110 and the contact server 112 as being separate servers. However, the functionality of the provider server 110 and the contact server 112 may be implemented at a single server. In a combined provider server 110/contact server 112 ("combined server") exemplary embodiment, an inviting user may instruct the inviting terminal 102 to forward an access request to the combined server. The combined server may authenticate the inviting user through a user identifier and/or login data associated or included in the access request, and may provide the inviting user access to a social networking application hosted by the combined server. The contact table 400 may include an extra column, instead of or in addition to a contact list, indicating whether the invitee users associated with the user identifier have previously logged on to the social networking application, and the combined server may determine whether to generate a notification message based on the contact table (e.g., opted in, available, etc.). For invitee terminals communicating via the data network 108, the combined server may attempt to obtain a data network address of the invitee terminal 104, as discussed above, and may forward notification messages to invitee terminals 104 via the data network 108 and/or the voice network 114. Generating notification messages may occur as discussed above.

Figure 9:
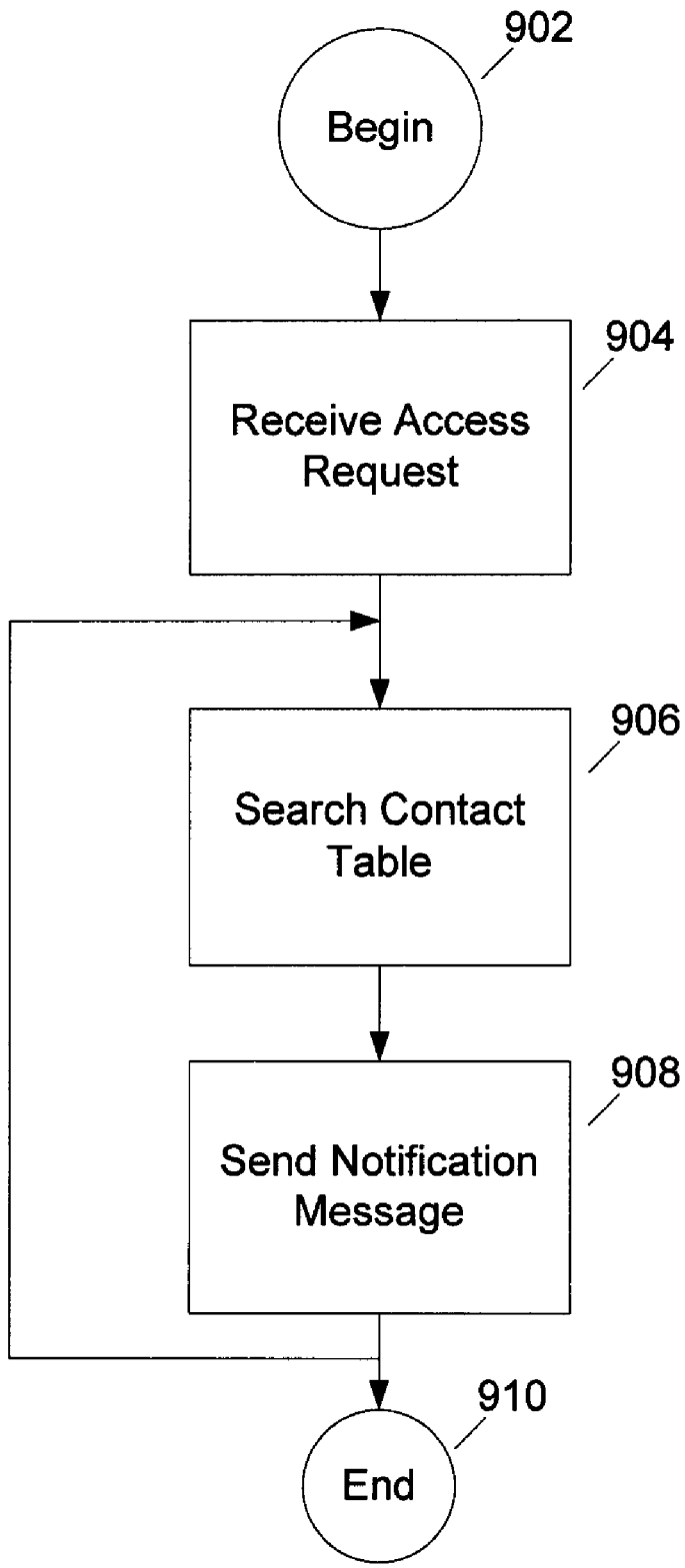
FIG. 9 illustrates a flow diagram for generating a notification message to notify an invitee user that an inviting user has logged on to access a social networking program in accordance with exemplary embodiments of the present disclosure.

FIG. 9 illustrates a flow diagram 900 of a method for generating a notification message to notify an invitee user that an inviting user has logged on to access a social networking program in accordance with exemplary embodiments of the present disclosure. This exemplary method is provided by way of example, as there are a variety of ways to carry out methods disclosed herein. The method 900 shown in FIG. 9 can be executed or otherwise performed by one or a combination of various systems. The method 900 is described below as carried out by the system 100 shown in FIG. 1 by way of example, and various elements of the system 100 are referenced in explaining the example method of FIG. 9. Each block shown in FIG. 9 represents one or more processes, methods or subroutines carried in the exemplary method 900. Referring to FIG. 9, in 902, the exemplary method begins and may continue to 904.

In 904, the flow diagram 900 may include receiving an access request from an inviting terminal 102 requesting access to a social networking application. In an exemplary embodiment implementing the combined provider server 110/contact server 112, the combined server may provide both the contact table and the social networking application. The inviting terminal 102 may forward the access request, which may include or may be associated with a user identifier of the inviting user, to the combined server via a data network 108 and/or voice network 114. The combined server may process the user identifier and may authenticate the inviting user to grant the inviting terminal 102 access to the social networking application. In an exemplary embodiment where the provider server 110 hosts the social networking application and the contact server 112 provides the contact table, the inviting terminal 102 may forward the access request associated with a user identifier of the inviting user to the provider server 110 via a data network 108 and/or voice network 114. The provider server 110 may process the access request and may authenticate the inviting terminal 102 to grant the inviting terminal access to the social networking application. Once authenticated, the provider server 110 may search a contact list associated with the inviting user to identify any invitee users who have not logged on to access the social networking application. The provider server 110 may forward to the contact server 112 an access event associated with the user identifier, where the access event also may include an application identifier associated with the social networking application and optionally one or more invitee identifiers or invitee users who have or have not logged on to the social networking application. The access event may optionally include a subapplication identifier if the inviting user has requested to access a subapplication within the social networking application. The flow diagram 900 may continue to 906.

In 906, the flow diagram 900 may include searching a contact table to identify contact information associated with an invitee terminal 104 based on the user identifier and optionally based on the application identifier. A contact module 206 of the contact server 112 may index a contact table 400 based on the user identifier, optionally based on the application identifier, and optionally based on a subapplication identifier. The contact module 206 may identify whether the user identifier and optionally the application identifier match an invitee user specified in the contact table 400. If any matches with one or more invitee users are identified for invitee users that have not opted out, for invitee users who are indicated as being available during the time period in which the access event is received, and for invitee users who have not previously logged on to the social networking application, the contact module 206 may forward, if specified in the contact table 400, a voice network number associated with each invitee to a notification module 210, and may query one or more messaging servers 118 to identify data network addresses assigned to invitee terminals 104 of each matching invitee user, and may forward the data network addresses, if available, to the notification module 210. The contact module 206 also may forward terminal contact order information to the notification module 210 of any invitee user associated with multiple invitee terminals 104. The flow diagram 900 may then continue to 908.

In 908, the flow diagram 900 may include sending a notification message based on the contact information, where the notification message may indicate to the invitee terminal 104 that the inviting terminal has accessed the social networking application. For example, a notification message may be communicated to the invitee terminal 104 outside of a communication session established between the invitee terminal 104 and the social networking application. In an exemplary embodiment, based on the identified voice network numbers and/or on the data network addresses, the notification module 210 may create notification messages appropriate for the capabilities of each invitee terminal (e.g., voice message for a voice terminal; audio, video, and/or text for a data terminal; etc.) and may make any necessary conversions (e.g., speech to text, text to speech, etc.). The notification message may instruct the invitee terminal 104 to display a notification message 700 with various fields permitting the invitee to access the social networking application, to ignore the invitation, to opt-out of receiving future invitations, and/or to modify preferences of the invitee user. Once the notification message is generated, the notification module 210 may instruct the communication module 202 to communicate the notification message to the invitee terminal 104. The communication of the notification message may occur outside of a communication session established using the social networking application. For example, the communication module 202 may communicate the notification message over a different network, using a different protocol, or any other communication path that does not use a communication session established between the social networking application and the invitee terminal 104. The flow diagram 900 may then return to 906 and repeat for all invitee users, may simultaneously or sequentially send the notification messages to all or some of the invitee terminals 104, etc. Once all notification messages have been sent, the flow diagram 900 may continue to 910 and end.

The following describes another exemplary embodiments of notifying invitee users about an inviting user having accessed a social networking application. In a first example, the social networking application is an multi-player online video game that players access and play over the Internet. An inviting user, using the inviting terminal 102, may communicate with a contact server 112 to set up a contact table and may associate the contact table with a user identifier of the inviting user. The inviting user may identify fellow gamer "Bob Jones" as an invitee identifier, and may include Bob's mobile telephone number, Bob's Instant Messaging identifier and associated instant messaging service as terminal contact information. The inviting user may specify to first contact Bob using the instant messaging service, and then Bob's mobile phone as the terminal contact order. The inviting user also may identify fellow gamer "Mary Smith" as an invitee identifier, and may include Mary's Instant Messaging identifier and associated instant messaging service as terminal contact information. The inviting user may login to access the multi-player online video game hosted by the provider server 110. The provider server 110 may examine a contact list of the inviting user and identify that one or more individuals (i.e., Bob and Mary) that the inviting users typically plays with are not logged on to the multi-player online video game. The provider server 110 may forward to the contact server 112 an access event that includes a user identifier of the inviting user and an application identifier of the multi-player online video game. Also, the access event may not include the user identifier and instead may include login data of the provider server 110 that may be used by the contact server 112 to retrieve the user identifier. The contact server 112 may identify the appropriate contact table for the inviting user based on the user identifier, and may then identify any matches with invitee users based on the application identifier.

In this example, the contact server 112 identifies Bob and Mary as matches. The contact server 112 then respectively queries the messaging server 118 that hosts Bob and Mary's messaging service based on their instant messaging identifier and associated instant messaging service, and may determine that Bob has logged on to the social networking application of the messaging server 118 and that Mary has not. The messaging server 118 then returns to the contact server 112 the data network address that has been assigned to Bob's terminal (i.e., invitee terminal 104). Because the messaging server 118 does not have any other contact information of Mary's, the messaging server 118 may send a data network message unknown to the contact server 112. Thus, the contact server 112 may determine not to send a notification message to Mary's invitee terminal 104.

The contact server 112 then creates and forwards a notification message outside of the social networking application useable to indicate to Bob's invitee terminal 104 that the inviting user has logged on to access the social networking application. Bob, via his invitee terminal 104, may respond to establish a communication session with the provider server 110 for accessing the multi-player online video game to interact with the inviting user. The notification message also may direct Bob to join an area within the game in which the inviting user is playing. In this example, the contact server 112 may generate an instant message that is communicated to Bob's invitee terminal 104 using the data network address obtained from the messaging server 118.

In another example, an inviting user may be a member of a fitness center who desires to inform her acquaintances that she has arrived at the fitness center. Before going to the fitness center, using an inviting terminal 102, the inviting user may communicate with a contact server 112 to set up a contact table for the inviting user associated with a user identifier of the inviting user. The inviting user may identify fellow member of the fitness center "Mary Smith" as an invitee identifier, and may include Mary's Instant Messaging identifier and associated instant messaging service, and Mary's mobile telephone number as terminal contact information. The inviting user may go to the fitness center and may swipe an access card having a user identifier at an access terminal 116 (e.g., card reader, RFID tag, etc.), which may forward an access request including the user identifier to a provider server 110. The provider server 110 may examine a contact list to identify that one or more individuals that the inviting user typically works out with (i.e., Mary) are not at the fitness center. The provider server 110 may forward to the contact server 112 an access event that includes the user identifier and an application identifier associated with the fitness center. The contact server 112 may identify the appropriate contact table based on the user identifier of the inviting user, and may then identify any matches with the application identifier. In this example, the contact server 112 identifies Mary as a match. The contact server 112 then queries the messaging server 118 that hosts Mary's messaging service, and determines that Mary has logged on to the messaging service. The messaging server 118 then returns to the contact server 112 the data network address that has been assigned to Mary's terminal (i.e., invitee terminal 104). The contact server 112 then creates and forwards a notification message based on the data network address useable to generate a notification at the invitee terminal 104, which may inform Mary that the inviting user is at the fitness center. If Mary had not been communicating via the messaging service, the contact server 112 may place a call to Mary's mobile phone to play a message pre-recorded by the inviting user that she is now at the fitness center, or to play a standard message informing Mary that the inviting user is at the fitness center. It is noted that the above system 100 may be used by the inviting user to inform others about the location of the inviting user. For example, scanning a RFID tag while leaving a parking garage, passing through a toll both, etc.

Thus, the system 100 in accordance with exemplary embodiments may permit an inviting user to notify invitee users who are not using a social networking application that the inviting user has logged on to access the social networking application. The system 100 may permit inviting users to forward notification messages to the invitee users outside of the social networking application.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
receiving an access request from an inviting terminal requesting access to a social networking application, the access request being associated with a user identifier;
searching a contact database, based on the user identifier and on an application identifier associated with the social networking application, to identify contact information associated with an invitee terminal not logged into the social networking application during a time of the searching;
querying a messaging server based on the contact information to determine whether the invitee terminal is communicating via the messaging server;
processing a query response that either includes a data network address assigned to the invitee terminal if the invitee terminal is communicating via the messaging server or includes a data network address unknown response; and
sending, in response to the access request, a notification message based on the contact information, the notification message containing the application identifier, the notification message useable to indicate to the invitee terminal that the inviting terminal has accessed the social networking application and to provide a geographical location of the inviting terminal to the invitee terminal, wherein the application identifier is usable to distinguish among a plurality of social networking applications.

2. The method of claim 1, wherein sending the notification message comprises identifying capabilities of the invitee terminal based on a type of the invitee terminal, wherein the type of the invitee terminal indicates whether the invitee can establish a communication session with a server hosting the social networking application.

3. The method of claim 1, wherein the notification message is associated with a join field, where selection of the join field instructs the invitee terminal to create and forward a join request to a server hosting the social networking application to establish a communication session with the server.

4. The method of claim 1, wherein the notification message is associated with an opt out field, where selection of the opt out field instructs the invitee terminal to create and forward an opt out request to update the contact database to prevent future notification messages from being communicated to the invitee terminal.

5. The method of claim 1, wherein the notification message is associated with an ignore field, where selection of the ignore field instructs the invitee terminal to ignore the notification message.

6. The method of claim 1, wherein the notification message is associated with a preferences field, where selection of the preferences field instructs the invitee terminal to create and forward a preferences request to update availability information and order information stored in the contact database.

7. The method of claim 6, wherein the availability information includes time information and date information.

8. The method of claim 1, further comprising communicating an access event comprising the user identifier and the application identifier from a provider server to a contact server.

9. The method of claim 1, wherein the data network address comprises an Internet Protocol address.

10. The method of claim 1, wherein the contact information comprises a telephone number.

11. A method comprising:
receiving an access request from inviting terminal requesting access to a social networking application, the access request being associated with a user identifier;
searching a contact database based on the user identifier and on an application identifier associated with the social networking application to identify contact information associated with an invitee terminal not logged into the social networking application during a time of the searching;
querying a messaging server based on the contact information to determine whether the invitee terminal is communicating via the messaging server;
processing a query response that either includes a data network address assigned to the invitee terminal if the invitee terminal is communicating via the messaging server or includes a data network address unknown response; and
sending, in response to the access request, a notification message containing the application identifier, based on the contact information, for communication to the invitee terminal outside of the social networking application to indicate that the inviting terminal has accessed the social networking application and to provide a geographical location of the inviting terminal to the invitee terminal, wherein the application identifier is usable to distinguish among a plurality of social networking applications.

12. The method of claim 11, further comprising processing a contact database request to update the contact database, the contact database request comprising an invitee identifier and the contact information associated with the invitee terminal.

13. A system comprising:
an inviting terminal communicatively coupled to a network, the inviting terminal to generate an access request to request access to a social networking application, the access request being associated with a user identifier;
an invitee terminal communicatively coupled to the network; and
a server communicatively coupled to the network, the server to receive the access request, to grant the inviting terminal access to the social networking application, and to search a contact database based on the user identifier and on an application identifier associated with the social networking application to identify contact information associated with the invitee terminal, the server configured to query a messaging server based on the contact information to determine whether the invitee terminal is communicating via the messaging server, the server configured to process a query response that either includes a data network address assigned to the invitee terminal if the invitee terminal is communicating via the messaging server or includes a data network address unknown response, the server to send, in response to the access request, a notification message containing the application identifier, based on the contact information, for communication to the invitee terminal outside of the social networking application to indicate that the inviting terminal has accessed the social networking application and to provide a geographical location of the inviting terminal to the invitee terminal, wherein the invitee terminal is configured to distinguish among a plurality of social networking applications using the application identifier and wherein the server is configured not to send the notification if the invitee terminal is logged into the social networking application during a time of the searching.

14. The system of claim 13, wherein the notification message identifies a location within the social networking application.

15. The system of claim 13, wherein the social networking application is a multi-player video game.

16. The system of claim 13, wherein the social networking application comprises a conference call system.

17. The system of claim 13, wherein the notification message comprises a link useable to establish a communication session between the invitee terminal and the server.

18. A system comprising:
an electronic communication device to receive an access request via a network;
an authentication module communicatively coupled to the communication module, the authentication module to grant an inviting terminal access to a social networking application based on the access request, the access request being associated with a user identifier;
a contact module communicatively coupled to the authentication module, the contact module to search a contact database based on the user identifier and on an application identifier associated with the social networking application to identify contact information associated with an invitee terminal not logged into the social networking application during a time of the searching, the contact module configured to query a messaging server based on the contact information to determine whether the invitee terminal is communicating via the messaging server, the contact module configured to process a query response that either includes a data network address assigned to the invitee terminal if the invitee terminal is communicating via the messaging server or includes a data network address unknown response; and
a notification module communicatively coupled to the contact module, the notification module to send, in response to the access request, a notification message containing the application identifier, based on the contact information, for communication to the invitee terminal outside of the social networking application to indicate that the inviting terminal has accessed the social networking application and to provide a geographical location of the inviting terminal to the invitee terminal, wherein the application identifier is usable to distinguish among a plurality of social networking applications.

19. A non-transitory computer readable storage medium for storing a computer program of instructions configured to be readable by at least one processor, the computer program of instructions comprising computer instructions for:
receiving an access request from an inviting terminal requesting access to a social networking application, the access request being associated with a user identifier;
searching a contact database, based on the user identifier and on an application identifier associated with the social networking application, to identify contact information associated with an invitee terminal not logged into the social networking application during a time of the searching;

querying a messaging server based on the contact information to determine whether the invitee terminal is communicating via the messaging server;

processing a query response that either includes a data network address assigned to the invitee terminal if the invitee terminal is communicating via the messaging server or includes a data network address unknown response; and sending, in response to the access request, a notification message based on the contact information, the notification message containing the application identifier, the notification message useable to indicate to the invitee terminal that the inviting terminal has accessed the social networking application and to provide a geographical location of the inviting terminal to the invitee terminal, wherein the application identifier is usable to distinguish among a plurality of social networking applications.

20. A non-transitory computer readable storage medium for storing a computer program of instructions configured to be readable by at least one processor, the computer program of instructions comprising computer instructions for:

receiving an access request from inviting terminal requesting access to a social networking application, the access request being associated with a user identifier;

searching a contact database based on the user identifier and on an application identifier associated with the social networking application to identify contact information associated with an invitee terminal not logged into the social networking application during a time of the searching;

querying a messaging server based on the contact information to determine whether the invitee terminal is communicating via the messaging server;

processing a query response that either includes a data network address assigned to the invitee terminal if the invitee terminal is communicating via the messaging server or includes a data network address unknown response; and sending, in response to the access request, a notification message containing the application identifier, based on the contact information, for communication to the invitee terminal outside of the social networking application to indicate that the inviting terminal has accessed the social networking application and to provide a geographical location of the inviting terminal to the invitee terminal, wherein the application identifier is usable to distinguish among a plurality of social networking applications.

* * * * *